(12) United States Patent
Lackner (10) Patent No.: US 11,478,745 B2
(45) Date of Patent: Oct. 25, 2022

(54) DEVICE AND METHOD FOR CO2 CAPTURE THROUGH CIRCUMSCRIBED HOLLOW MEMBRANES

(71) Applicant: ARIZONA BOARD OF REGENTS ON BEHALF OF ARIZONA STATE UNIVERSITY, Scottsdale, AZ (US)

(72) Inventor: Klaus Lackner, Paradise Valley, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 114 days.

(21) Appl. No.: 17/010,799

(22) Filed: Sep. 2, 2020

(65) Prior Publication Data
US 2021/0060483 A1 Mar. 4, 2021

Related U.S. Application Data

(60) Provisional application No. 62/895,254, filed on Sep. 3, 2019.

(51) Int. Cl.
*B01D 53/22* (2006.01)
*B01D 8/00* (2006.01)
*B01D 53/26* (2006.01)

(52) U.S. Cl.
CPC ............ *B01D 53/229* (2013.01); *B01D 8/00* (2013.01); *B01D 53/227* (2013.01); *B01D 53/265* (2013.01); *B01D 2053/224* (2013.01)

(58) Field of Classification Search
None
See application file for complete search history.

(56) References Cited

U.S. PATENT DOCUMENTS

| | | | |
|---|---|---|---|
| 2006/0162554 A1* | 7/2006 | Kelley | B01D 53/22 95/45 |
| 2008/0011161 A1* | 1/2008 | Finkenrath | B01D 53/229 96/4 |
| 2014/0102297 A1* | 4/2014 | Hamad | B01D 53/22 96/4 |

* cited by examiner

*Primary Examiner* — Jason M Greene
(74) *Attorney, Agent, or Firm* — Rodney J. Fuller; Booth Udall Fuller, PLC (57) ABSTRACT

A device and method for carbon dioxide capture using circumscribed hollow membranes is disclosed. The device includes a hollow membrane unit having an inner conduit composed of a vapor membrane, and an outer conduit having an inside surface circumscribing the inner conduit forming a lumen. The outer conduit includes a $CO_2$ pump membrane. The device also includes a mechanical pump maintaining a pressure differential between the lumen and the atmosphere, providing a product stream of $CO_2$-rich gas from the lumen. The vapor membrane is sufficiently hydrophobic and porous to contain liquid water while also allowing water vapor formed by evaporation to pass through into the lumen. As water vapor passes from the lumen to the atmosphere through the $CO_2$ pump membrane, a carbon concentration gradient is formed and maintained across the $CO_2$ pump membrane. The carbon concentration gradient actively pumps $CO_2$ out of the atmosphere and into the lumen.

17 Claims, 3 Drawing Sheets

DEVICE AND METHOD FOR CO2 CAPTURE THROUGH CIRCUMSCRIBED HOLLOW MEMBRANES

RELATED APPLICATIONS

This application claims the benefit of U.S. provisional patent application 62/895,254, filed Sep. 3, 2019 titled "Device, System, and Method for $CO_2$ Capture Through Circumscribed Hollow Membranes," the entirety of the disclosure of which is hereby incorporated by this reference thereto.

TECHNICAL FIELD

Aspects of this document relate generally to the capture of gaseous carbon dioxide.

BACKGROUND

Extracting $CO_2$ from the air has been noted as one of the few technologies able to recover excess carbon from the environment. In addition to ecological concerns, there are also substantial markets for $CO_2$ taken from the atmosphere. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk. Additionally, conventional carbon dioxide collection systems often exhibit the unfortunate combination of being costly and fragile. Conventional capture devices also often have a large initial capital cost along with a high operating cost. As $CO_2$ capture will need to occur on a large scale, simple, efficient, low cost designs will play an important role in commercial application of atmospheric $CO_2$ capture technologies.

State of the art direct air capture devices can reduce the energy and financial cost, as well as the mechanical complexity and fragility, to a practical level. These devices can passively collect atmospheric $CO_2$ from the ambient air using sorbent materials that capture the carbon dioxide from the atmosphere and subsequently release it for use or sequestration. Many of the sorbents that can be used are liquid. Furthermore, in order to be strong enough to readily bind $CO_2$ in ambient conditions, these liquid sorbents tend to be quite corrosive, posing a safety risk in addition to an implementation hurdle.

SUMMARY

According to one aspect, a device for carbon dioxide capture includes a hollow membrane unit, the hollow membrane unit having an inner conduit closed at one end. The inner conduit includes a vapor membrane. The hollow membrane unit also includes an outer conduit having an outside surface exposed to an atmosphere and an inside surface circumscribing the inner conduit forming a lumen between the inner conduit and the inside surface of the outer conduit. The outer conduit includes a $CO_2$ pump membrane, the lumen includes a $CO_2$-rich gas and a water vapor, and the water vapor is substantially saturated. The hollow membrane unit also includes a light-absorbing material. The device includes a water supply in fluid communication with the inside of the inner conduit, and a mechanical pump in fluid communication with the lumen. the mechanical pump maintains a pressure differential of at least one atmosphere between the lumen and the atmosphere and provides a product stream including the $CO_2$-rich gas. The device also includes a cold trap coupled to the hollow membrane unit and the mechanical pump such that the mechanical pump is in fluid communication with the lumen of the hollow membrane unit through the cold trap. The vapor membrane contains liquid water provided by the water supply, the vapor membrane being sufficiently hydrophobic and porous to contain the liquid water received while also allowing water vapor to pass through the vapor membrane into the lumen. The water vapor is formed by the evaporation of the liquid water. The $CO_2$ pump membrane is $CO_2$-permeable and, as water vapor passes from the lumen to the atmosphere through the $CO_2$ pump membrane, a carbon concentration gradient is formed and maintained across the $CO_2$ pump membrane with a first concentration at the outside surface that is higher than a second concentration at the inside surface, said carbon concentration gradient actively pumping $CO_2$ out of the atmosphere and into the lumen. The liquid water inside the inner conduit is heated by sunlight absorbed by the light-absorbing material to a temperature that is above an ambient temperature, thereby facilitating the evaporation of the liquid water to introduce water vapor into the lumen.

Particular embodiments may comprise one or more of the following features. The $CO_2$ pump membrane may include a strong base anionic material. The mechanical pump may remove $CO_2$-rich gas and water vapor from within the lumen at substantially the same rate as $CO_2$ and water vapor are introduced to the lumen through the water membrane and the $CO_2$ pump membranes. The device may also include a plurality of hollow membrane units coupled to a manifold, the inner conduit of each hollow membrane unit may be in fluid communication with the water supply, and the lumen of each hollow membrane unit may be in fluid communication with the mechanical pump through the manifold.

According to another aspect of the disclosure, a device for carbon dioxide capture includes a hollow membrane unit having an inner conduit closed at one end. The inner conduit includes a vapor membrane. The hollow membrane unit also includes an outer conduit having an outside surface exposed to an atmosphere and an inside surface circumscribing the inner conduit forming a lumen between the inner conduit and the inside surface of the outer conduit. The outer conduit includes a $CO_2$ pump membrane, and the lumen includes a $CO_2$-rich gas and a water vapor. The device includes a water supply in fluid communication with the inside of the inner conduit, and a mechanical pump in fluid communication with the lumen. The mechanical pump maintains a pressure differential between the lumen and the atmosphere and provides a product stream comprising the $CO_2$-rich gas. The vapor membrane contains liquid water provided by the water supply, the vapor membrane being sufficiently hydrophobic and porous to contain the liquid water received while also allowing water vapor to pass through the vapor membrane into the lumen. The water vapor is formed by the evaporation of the liquid water. The $CO_2$ pump membrane is $CO_2$-permeable and, as water vapor passes from the lumen to the atmosphere through the $CO_2$ pump membrane, a carbon concentration gradient is formed and maintained across the $CO_2$ pump membrane with a first concentration at the outside surface that is higher than a second concentration at the inside surface, said carbon concentration gradient actively pumping $CO_2$ out of the atmosphere and into the lumen.

Particular embodiments may comprise one or more of the following features. The device may further include a cold trap coupled to the hollow membrane unit and/or the mechanical pump such that the mechanical pump may be in fluid communication with the lumen of the hollow membrane unit through the cold trap. The liquid water inside the inner conduit may be heated to a temperature that is above an ambient temperature, thereby facilitating the evaporation of the liquid water to introduce water vapor into the lumen. The hollow membrane unit may include a light-absorbing material and/or the liquid water inside the inner conduit may be heated by sunlight absorbed by the light-absorbing material. The $CO_2$ pump membrane may include a strong base anionic material. The mechanical pump may remove $CO_2$-rich gas and water vapor from within the lumen at substantially the same rate as $CO_2$ and water vapor are introduced to the lumen through the water membrane and the $CO_2$ pump membranes. The water vapor within the lumen may be substantially saturated. The device may further include a plurality of hollow membrane units coupled to a manifold. The inner conduit of each hollow membrane unit may be in fluid communication with the water supply, and/or the lumen of each hollow membrane unit may be in fluid communication with the mechanical pump through the manifold.

According to yet another aspect of the disclosure, a method for carbon dioxide capture includes filling an inner conduit with liquid water from a water supply in fluid communication with the inside of the inner conduit. The inner conduit includes a vapor membrane and is circumscribed within an outer conduit having an outside surface exposed to an atmosphere and an inside surface facing the inner conduit forming a lumen between the inner conduit and the inside surface of the outer conduit, the lumen running the length of the outer conduit, the outer conduit including a $CO_2$ pump membrane that is $CO_2$-permeable. The method also includes introducing a water vapor into the lumen by allowing the liquid water inside the inner conduit to evaporate and pass through the vapor membrane, the vapor membrane being sufficiently hydrophobic and porous to contain the liquid water while also allowing water vapor to pass through the vapor membrane into the lumen. The method includes forming and maintaining a carbon concentration gradient across the $CO_2$ pump membrane by allowing water vapor to pass from the lumen to the atmosphere through the $CO_2$ pump membrane, the carbon concentration gradient having a first concentration at the outside surface that is higher than a second concentration at the inside surface, said carbon concentration gradient actively pumping $CO_2$ out of the atmosphere and into the lumen as a $CO_2$-rich gas. The method also includes removing $CO_2$-rich gas and water vapor from the lumen with a mechanical pump that is in fluid communication with the lumen, the mechanical pump maintaining a pressure differential between the lumen and the atmosphere and providing a product stream including the $CO_2$-rich gas.

Particular embodiments may comprise one or more of the following features. The method may further include substantially evacuating the lumen before introducing the water vapor into the lumen. The method may further include condensing the water vapor at it is removed from the lumen with the $CO_2$-rich gas. The water vapor may be condensed with a cold trap coupled to the lumen and the mechanical pump such that the mechanical pump may be in fluid communication with the lumen of the hollow membrane unit through the cold trap. The method may further include heating the liquid water to a temperature that may be above an ambient temperature to facilitate the evaporation of the liquid water while inside the inner conduit to introduce water vapor into the lumen. The liquid water may be heated by sunlight absorbed by a light-absorbing material in thermal contact with the inner conduit. The $CO_2$-rich gas and water vapor may be removed from within the lumen at substantially the same rate as $CO_2$ and water vapor are introduced to the lumen through the water membrane and the $CO_2$ pump membranes. The water vapor within the lumen may be substantially saturated.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Extracting $CO_2$ from the air has been noted as one of the few technologies able to recover excess carbon from the environment. In addition to ecological concerns, there are also substantial markets for $CO_2$ taken from the atmosphere. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk. Additionally, conventional carbon dioxide collection systems often exhibit the unfortunate combination of being costly and fragile. Conventional capture devices also often have a large initial capital cost along with a high operating cost. As $CO_2$ capture will need to occur on a large scale, simple, efficient, low cost designs will play an important role in commercial application of atmospheric $CO_2$ capture technologies.

State of the art direct air capture devices can reduce the energy and financial cost, as well as the mechanical complexity and fragility, to a practical level. These devices can passively collect atmospheric $CO_2$ from the ambient air using sorbent materials that capture the carbon dioxide from the atmosphere and subsequently release it for use or sequestration. Many of the sorbents that can be used are liquid. Furthermore, in order to be strong enough to readily bind $CO_2$ in ambient conditions, these liquid sorbents tend to be quite corrosive, posing a safety risk in addition to an implementation hurdle.

Contemplated herein is a device and method for continuous $CO_2$ capture using moisture-driven, circumscribed hollow membranes. The basic capture structure is composed of hollow membranes formed into intercalated conduits, with an outer conduit composed of a carbon dioxide extraction or pumping material, and an inner conduit located in the hollow of the outer conduit. Liquid water within the inner conduit evaporates, and the resultant water vapor passes through the wall of the inner conduit, which is composed of a hydrophobic porous material. As this water vapor passes through the walls of the outer conduits, carbon dioxide is actively pumped out of the atmosphere and into the lumen, against a concentration gradient, as will be discussed in greater detail, below.

This technology improves upon current direct air capture (DAC) technology by eliminating a great deal of equipment, moving parts, energy expenditure, and cost. Additionally, systems and devices using the circumscribed hollow membranes contemplated herein do not require the use of strong sorbent liquids, and are thus relatively benign, posing little risk of releasing hazardous materials. The safe nature of these devices makes them well suited for unsupervised operation, even in an urban environment.

While both technologies make use of materials having similar properties, the systems, devices, and methods contemplated herein are advantageous over other capture methods making use of swing materials, such as heat and/or moisture swing materials. Swing-based methods fundamentally have two phases or states of operation, capture and release. Transitioning between states typically requires energy expenditure and often require the incorporation of moving parts, ranging from actuated valves to lifting motors and/or hydraulics. Swing-based devices provide product gas (e.g. $CO_2$-enriched gas, etc.) in bursts. A continuous product stream is possible through the coordinated operation of multiple swing units, timed such that at least one unit is always releasing the captured carbon dioxide.

Advantageously, the systems, devices, and methods contemplated herein employ a continuous, pumping action, providing a continuous stream of $CO_2$-rich product gas. For some applications, such as applications with continuous processing or output, a continuous stream of carbon dioxide may be preferred, due to cost and/or efficiency, over gas provided in batches. Additionally, the continuous capture devices and methods contemplated herein typically make use of structures and mechanisms that are much simpler than those used in swing-based technology that must toggle between capture and release phases. This may decrease the cost of manufacture as well as operation and upkeep.

Figure 1:
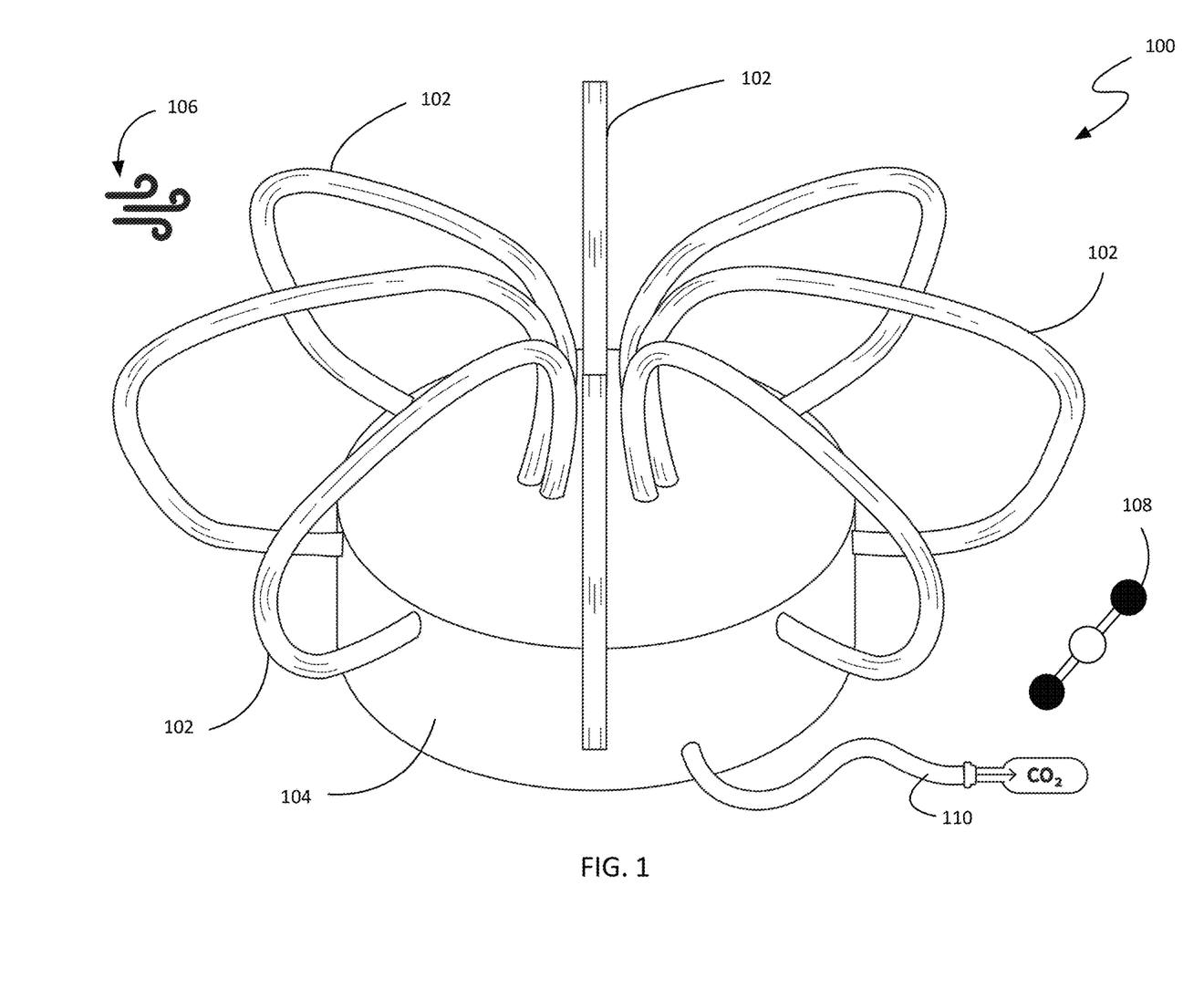
FIG. 1 is a perspective view of a device for carbon dioxide capture.

FIG. 1 is a perspective view of a non-limiting example of a device for carbon dioxide capture. Specifically, FIG. 1 shows a non-limiting example of a circumscribed hollow membrane (hereinafter CHM) device for carbon dioxide capture. As shown, the CHM device 100 comprises a plurality of circumscribed hollow membrane units 102, each coupled to a shared manifold 104. The CHM device 100 produces a product stream 110 or carbon dioxide, or carbon dioxide enriched gas. The CHM units 102 each comprise a $CO_2$ pump membrane wrapped around a vapor membrane, forming two intercalated conduits, one circumscribed by the other. These conduits work together to actively extract carbon dioxide 108 out of the surrounding atmosphere 106. The innermost conduit is filled with liquid water, and provides water vapor that drives the outermost conduit to actively pump carbon dioxide against a concentration gradient. The exergy required for this action is derived from the dilution of water into the atmosphere 106 as it flows spontaneously from a higher chemical potential to a lower chemical potential. The CHM unit 102 will be discussed in greater detail with respect to FIGS. 2 and 3, below.

In the context of the present description and the claims that follow, a manifold 104 is a chamber into which one or more CHM units 102, or most specifically the lumens of one or more CHM units 102, have fluid communication. The continuous stream of carbon dioxide rich gas extracted from the atmosphere 106 provided by the various CHM units 102 is gathered inside this chamber before consolidation into a product stream 110. In some embodiments, the manifold 104 may also contain other elements of the CHM device, such as a mechanical pump and/or cold trap, as will be discussed with respect to FIG. 2, below.

It should be noted that while the following discussion is made in the context of CHM device 100 that passively (e.g. relying on natural air currents, etc.) capture gaseous carbon dioxide 108 from the atmosphere 106, the various embodiments contemplated herein may be readily adapted for use in capturing $CO_2$ from non-atmospheric sources (e.g. upgrading gas captured using these or other methods, etc.), and may also be readily adapted for use in non-passive systems (e.g. using forced air, etc.). Additionally, in the context of the present description and the claims that follow, the terms 'atmosphere 106' or 'atmospheric' refers to the environment immediately outside of the CHM device 102, and should not be interpreted to be limited to outdoor environments, or to exclude environments that are not in fluid communication with the ambient air.

As shown, the CHM device 102 outputs a product stream 110. In the context of the present description and the claims that follow, a product stream 110 from a CHM device 102 is a stream of gas having a higher carbon dioxide concentration than the atmosphere 106. While the following discussion of various embodiments of the CHM device 100 are in the context of a gaseous product stream 110, it should be noted that in some embodiments, the product stream 110 may be a liquid, such as a liquid having a high concentration of dissolved inorganic carbon compounds extracted from the atmosphere 106. One of the advantageous features of the CHM device 100 is that the resultant product stream 110 may be continuous. The product stream 110 may be stored for subsequent processing or use, or it may be inserted directly into an application local to the device 102.

There is a multitude of different arrangements possible for a plurality of circumscribed hollow membrane units 102 to be arranged in. Some of these arrangements may be configured to make the most of the natural ambient airflow. Airflow can be perpendicular to the conduit axis, or in the direction of the conduit axis, or at some other angle.

The CHM units 102 themselves can be arranged in a circular pattern, so that they form a vertical column to maximize exposure of many units to wind from any direction. This tall columnar geometry may be advantageous in environments where a small footprint is desired, such as an urban environment. Columns may be spaced from each other to avoid interfering with each other. Mechanical pumps, sensors, control circuits and the like may be operated using solar power, in some embodiments. Some embodiments may even be stylized as trees or other tall structures, as will be discussed further, below.

The devices 100 making use of circumscribed hollow membrane units 102 may employ many units. The number and arrangement of the units 102 may be chosen to maximize the exposed surface area while still allowing sufficient airflow to pass among the units 102. According to various embodiments, the units may number from the hundreds to the thousands, per device 100.

Other embodiments, including the non-limiting example shown in FIG. 1, may employ a short geometry, or a geometry whose units 102 are more horizontal than vertical. A short geometry may be advantageous in that it does not need the level of scaffolding or external support that a tall geometry would need, significantly reducing the capital cost. The lower cost may allow for the creation of more devices, offsetting their reduced capacity in comparison to taller, scaffolding-heavy designs. Furthermore, in short geometries typically are easier to prevent liquid water from leaking into the lumen between the inner and outer conduits of a CHM unit 102, since there is less risk for the hydrostatic pressure of the inner conduit filled with liquid water from overcoming the capillary pressure of the vapor membrane. It should be noted that the methods contemplated herein may be adapted to other device geometries and configurations as well.

Figure 2:
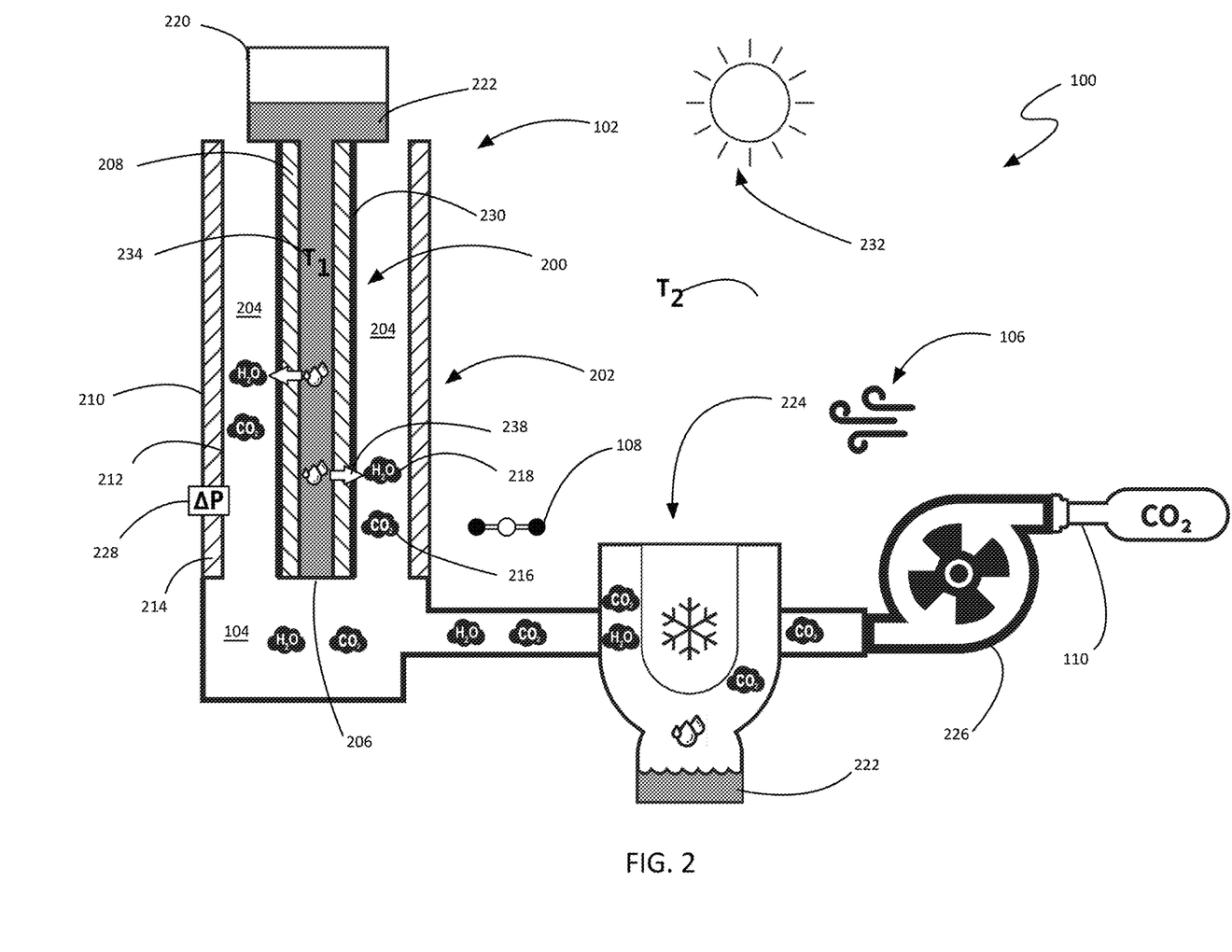
FIG. 2 is a schematic view of a device for carbon dioxide capture.

FIG. 2 is a schematic view of a non-limiting example of a CHM device 100 for carbon dioxide capture. Because this Figure is schematic in nature, it is providing an internal view of the CHM unit 102. Additionally, the CHM device 100 shown only comprises a single CHM unit 102 and is not arranged in a very compact configuration, for simplicity. These constraints that have been made to simplify the presentation of a clear example of a CHM device 100 and its various components should not be interpreted as a limitation on embodiments in practice. As shown in FIG. 1, some embodiments of the CHM device 100 may comprise multiple CHM units 102.

According to various embodiments, the CHM device 100 comprises a circumscribed hollow membrane unit 102, a water supply 220, and a mechanical pump 226. The CHM unit 102 is the workhorse of the device 102, and is responsible for extracting $CO_2$ from the atmosphere 106. As shown, the CHM unit 102 comprises an inner conduit 200 and an outer conduit 202. In the context of the present description and the claims that follow, a conduit, whether an inner conduit 200 or an outer conduit 202, refers to a channel or tube that is able to convey a fluid, whether it be a liquid or a gas. Although the word 'tube' may be used to describe a conduit, the conduits contemplated herein are not limited to hollow cylinders, but rather could be any hollow body having at least one end point, or aperture through which a fluid may be conveyed. Some conduits may have two such apertures, allowing for a fluid to flow from one aperture, through the hollow void, and out the other aperture. However, some conduits may have a single traditional aperture through which a fluid may pass, and may also be composed of materials that are permeable to one or more fluids, such that fluid may pass through the wall of the conduit, into the hollow void, and then be extracted from the void through the aperture. The permeability of the walls of such a conduit does not exclude the body from being considered a conduit, since while some fluids may pass through the walls, others may not, and would be constrained to using the aperture for any entrance or exit from the hollow void. According to various embodiments, the inner conduit 200 and outer conduit 202 may be any hollow structure with at least one fluid aperture, composed of a material that may be permeable to one or more fluids, but is also substantially impermeable to other fluids, under the temperature and pressure conditions in which the device 100 is intended to operate. Those skilled in the art will recognize that such conditions may vary, depending on the fluids being considered and the materials being used.

As shown, the inner conduit 200 contains liquid water 222, and comprises a vapor membrane 208. In the context of the present description and the claims that follow, a vapor membrane 208 is a membrane that is both hydrophobic and porous. More specifically, the vapor membrane 208 is a membrane that is sufficiently hydrophobic and has pores sufficiently small that the flow of liquid water 222 across the membrane is avoided while the CHM unit 102 is operating at internal pressures resulting from the overall shape of the conduit (e.g. vertical, helical, etc.). The shape and orientation of the inner conduit 200 may greatly influence these internal pressures, with vertical conduits experiencing greater hydrostatic pressure due to gravity than horizontal, water-filled conduits. The hydrophobic material helps avoid pushing fluid through the membrane as it prevents liquid flow through the pores due to a high capillary pressure. The size of the pores and the degree of hydrophobicity determines the maximum pressure the liquid water 222 can be under without compromising the operation of the device 100, and may constrain implementation geometries and scales.

The vapor membrane 208 is able to contain liquid water 222 while also allowing it to evaporate and pass through. The vapor membrane 208 is permeable to water vapor 218. As will be discussed in greater detail below, as the liquid water 222 within the inner conduit 200 evaporates, the resulting water vapor 218 passes through the vapor membrane 208.

The outer conduit 202 has an outside surface 210 that is exposed to the atmosphere 106 from which the device 100 will draw carbon dioxide 108, and an inside surface 212 that circumscribes the inner conduit 200 to form a lumen 204, or hollow space, between the inner conduit 200 and the inside surface 212 of the outer conduit 202. The outer conduit 202 comprises a $CO_2$ pump membrane 214. In the context of the present description and the claims that follow, a $CO_2$ pump membrane 214 is a $CO_2$ permeable membrane that actively pumps carbon dioxide 108 while transferring moisture (i.e. water vapor 218) from a wet side (i.e. inside surface 212) to a dry side (i.e. outside surface 210). The properties and functionality of the $CO_2$ pump membrane 214 will be discussed in greater detail with respect to FIG. 3, below.

A transfer of carbon dioxide gas from an external or ambient air current, through the $CO_2$ pump membrane 214, to the lumen 204, will depend in part upon the fluid dynamic characteristics of the outer conduit 202, such as the thickness of the boundary layer on the outside. Some embodiments may comprise outer conduits 202 that are composed entirely of a single $CO_2$ pump membrane 214, which may be easier to make smooth and thereby reduce the boundary layer thickness. In other embodiments, an outer conduit 202 may be composed of one or more $CO_2$ pump membranes 214 coupled to, or integral with, other materials that may provide structural and/or manufacturing advantages that may outweigh any boundary layer thickening caused by discontinuities in the surface. In some embodiments, a $CO_2$ pump membrane 214 may be coupled to another material inside of the hollow void, such as a porous backing to provide mechanical strength.

As shown, the outer conduit 202 surrounds and circumscribes the inner conduit 200, forming a lumen 204 that runs along the length of the conduits. In the non-limiting example shown in FIG. 2, the lumen 204 is symmetrical, created by placing the inner conduit 200 inside the hollow of the outer conduit 202, forming a lumen 204 with a uniform, annular cross-section. However, according to various embodiments, the lumen 204 may take on any shape. In some embodiments, the lumen 204 is symmetrical, with respect to one of the conduits or otherwise, while in other embodiments the lumen 204 may be asymmetrical. In some embodiments, the lumen 204 may be continuous throughout the CHM unit 102, while in other embodiments, multiple lumens 204 may exist along the length of the unit 102.

It should be noted here that, while the term "circumscribed" is used throughout, describing the one or more circumscribed hollow membrane units 102 that are part of a circumscribed hollow membrane device 100, it should not be interpreted as a limitation, but rather a boundary condition. According to various embodiments, the lumen 204 may include points where the inner conduit 200 and the outer conduit 202 touch, the outer conduit 202 thus circumscribing the inner conduit 200, in other embodiments, the conduits may be so arranged that they do not touch, and the inner conduit 200 would be better described as being inscribed within the outer conduit 202. In still other embodiments, the inner conduit 200 may intersect with the outer conduit 202, such that the inner conduit 200 exists in part outside of the outer conduit 202. As a specific example, in one embodiment, the inner conduit 200 is circumscribed by the outer conduit 202 except at one end where the inner conduit 200 passes through the wall of the outer conduit 202, allowing the outer conduit 202 to be a closed void and the inner conduit 200 to be coupled to a water supply outside of the outer conduit 202. In the context of the present description and the claims that follow, the term circumscribed, as used to describe the relative position of inner and outer conduits, should be taken to mean "predominantly inside of, and possibly touching or cutting". In other words, as used herein, the term circumscribed also includes configurations that could be referred to as inscribed.

As shown, in operation, the lumen 204 contains a $CO_2$-rich gas 216 formed of the carbon dioxide 108 pumped out of the atmosphere 106 by the $CO_2$ pumping membrane 214 of the outer conduit 202, and water vapor 218 passing through the vapor membrane 208 of the inner conduit 200. In some embodiments, both ends of the circumscribed hollow membrane unit(s) 102 may be open, and a sweep gas (e.g. moist air, nitrogen, oxygen, etc.) may be passed through to sweep the $CO_2$-rich gas 216 and water vapor 218 into a manifold 104 (or directly into a mechanical pump 226). In other embodiments, one end of the circumscribed hollow membrane unit 102 may be closed. In still other embodiments, particularly embodiments having a vertical arrangement, the lower end of the lumen 204 may open into the manifold 104, the lower end 206 of the inner conduit may be closed, while the upper end of the lumen 204 may be closed. Such an embodiment would be described as a lumen with a single aperture, as was discussed above.

The inner conduit 200 provides water vapor 218 to the lumen 204 when liquid water 222 inside the inner conduit 200 evaporates 238. According to some embodiments, the inner conduit 200 may be closed at one end 206, and in fluid communication with a water supply 220 at the other end. In other embodiments, the inner conduit 200 may be coupled at both ends to the water supply 220. The water supply 220 provides replacement liquid water 222 to the inner conduit 200 to replace the water lost to evaporation 238. In some embodiments, the water supply 220 may be positioned above the inner conduit 200, using gravity to ensure the inner conduit 200 is filled with liquid water 222. In other embodiments, the water supply 220 may feed water to the inner conduit 200 through the use of a pump, or other methods for moving liquid known in the art.

In operation, the water vapor 218 in the lumen 204 substantially saturated at a given operating temperature, according to various embodiments. In the context of the present description and the claims that follow, substantially saturated means a water saturation in the lumen that is substantially higher than in the ambient air outside of the lumen, and at least 90% humidity. In some embodiments, the relative humidity within the lumen may be even higher, in excess of 90% in some embodiments, and in excess of 99% in others. In other embodiments, however, the relative humidity within the lumen may be closer to the midpoint between full saturation and the ambient relative humidity, or possibly even lower, so long as the lumen is more saturated than the ambient air. Such a configuration may be desirable in conditions where the ambient humidity is very low and where there are constraints on the water supply used to replenish the inner conduit 200.

The maintenance of this water vapor 210 will influence the rate at which $CO_2$ 108 is pulled out of the atmosphere 106, through the outer conduit 202, and into the lumen 204. In some embodiments, the water vapor 218 is supplied by one inner conduit 200 filled with liquid water 222, while in other embodiments, multiple inner conduits 200 may be used, each composed of a vapor membrane 208.

In some embodiments, the cross section of the conduit(s) may be roughly symmetrical about the central axis (e.g. the cross section is roughly the same size in all radial directions, etc.). In other embodiments, the cross section may be much larger in one radial direction than another, even one or more orders of magnitude larger. Such conduits may have the appearance of a hollow sheet or other sheet-like structure.

As a specific example, in one embodiment, the outer conduit 202 may be shaped like a flat leaf with at least one side formed from the $CO_2$ pump membrane 214, while one or more inner conduits 200 made of vapor membrane 208 may be arranged in a vein-like pattern throughout the lumen 204 of the leaf-shaped outer conduit 202. Such shapes may be advantageous in use within populated environments, providing a device that is aesthetically pleasing while still performing efficiently.

In some embodiments, the outer conduit 202 may be tubular, having a substantially circular cross section. The circular cross section may be utilized to permit capture from wind or air currents efficiently regardless of what direction (i.e. angle of approach within a plane normal to the central axis of the conduit) the airflow is approaching the conduit from. This flexibility is advantageous for implementations that passively capture $CO_2$ from natural air currents such as wind that may change direction. In other embodiments, the conduit(s) may have non-circular cross sections, which may be advantageous for use in circumstances where the airflow is predictable, and may offer structural and/or manufacturing advantages.

The diameter of the conduits may be chosen large enough that pressure drops within the conduit from flow friction are negligible. Typical sizes can range from a fraction of a millimeter to a few millimeters for the diameter of the tube. In embodiments where the cross sectional shape of the conduit is far from circular, these exemplary dimensions may refer to the smallest characteristic dimension.

The dimensions of the conduits may be designed for an improved uptake rate of $CO_2$ on the surface of the $CO_2$ pump membrane 214. Flow rates within the lumen 204 are designed to match the uptake rates from the air. The uptake rate on the outer conduit 202 will depend on the material choice for the $CO_2$ pump membrane. These mass transfer coefficients will need to be matched with the mass transfer coefficient across the boundary layer along the outer surface of the outer conduit 202 (e.g. the boundary layer created as air flows past the conduit). Matching these coefficients constrains the dimensions of the conduits (e.g. the diameter of a tubular outer conduit, etc.).

For small conduits and low flow speeds, the boundary layer thickness is directly related to the dimensions of the conduit. The boundary layer thickness results in a transfer coefficient for $CO_2$ from the open air to the surface of the conduit, which is given by the diffusion constant divided by the thickness of the boundary layer. This coefficient can be matched to the membranes transfer coefficient. By selecting $CO_2$ pump membrane 214 materials and outer conduit 202 geometries such that these coefficients are substantially similar to each other, none of the various transfers dominates the process.

In operation, water vapor 218 will permeate from the inner conduit 200, into the lumen 204. Some of the water vapor 218 will continue on, transferring through the outer conduit 202. The resulting pumping action will raise the $CO_2$ concentration in the lumen 204. Pumping or otherwise lowering the pressure at the exit of the lumen 204 will result in steady gas flow to the exit. As the lumen 204 is evacuated, water evaporation from the inner conduit 200 will maintain water vapor saturation. This in turn will pull $CO_2$ from the atmosphere outside the outer conduit 202 into the lumen 204. In some embodiments, a slow flow of sweep gas can collect the mixture of water vapor and $CO_2$ at the terminus of the lumen 204.

In some embodiments, the gas mixture is extracted from the lumen 204 by a mechanical pumping action. In other embodiments, part or all of the extraction may be driven by a pressure drop created via the condensation of water vapor on a cold zone provided in the manifold, near the exit of the lumen 204. Other embodiments may employ both methods. Thermal management could very accurately control the flow rate of the $CO_2$/vapor mix, such that the removal rate of the $CO_2$ from lumen 204 matches the $CO_2$ pumping rate and a high concentration of $CO_2$ in the lumen 204 can be maintained. Specifically, in some embodiments, the mechanical pump 226 removes $CO_2$-rich gas 216 and water vapor 218 from within the lumen 204 at substantially the same rate as $CO_2$ 108 and water vapor 218 are introduced to the lumen 204 through the vapor membrane 208 and the $CO_2$ pump membrane 214. The $CO_2$ collected may then be further processed (e.g. dried, cleaned of residual oxygen, compressed, upgraded, etc.).

As shown, the CHM device 100 may further comprise a mechanical pump 226. According to various embodiments, the mechanical pump 226 is in fluid communication with the lumen 204, and may be any form of gas pump known in the art. The mechanical pump 226 is operated to maintain a pressure differential 228 between the lumen 204 and the atmosphere 106, pulling from the lumen 204 a product stream 110 comprising the $CO_2$-rich gas 216 and water vapor 218, in some embodiments.

In some embodiments, the lumen 204 may be substantially evacuated before operation (e.g. introducing water vapor 218 into the lumen 204, etc.), resulting in the lumen 204 filling with mostly water vapor 218 and $CO_2$-rich gas 216 pumped from the atmosphere 106. In the context of the present description and the claims that follow, substantially evacuated means the system pressure is lowered to be between the water vapor pressure at the triple point of ice and the water vapor pressure at ambient temperatures. It is desirable that the lumen pressure stay below the combined pressure of water and carbon dioxide; the lower the pressure, the deeper the unloading. In some embodiments, the lumen may be pumped down to a pressure between 1 kPa and 10 kPa. In other embodiments, the lumen may be pumped down to a pressure between 1 kPa and 2 kPa.

According to various embodiments, the outer conduit 202 is made sturdy enough, or thick enough, such that the lumen 204 can be evacuated without the outer conduit 202 collapsing under atmospheric pressure. In some embodiments, the lumen 204 is made to withstand a pressure differential 228 of at least one atmosphere. Some embodiments accomplish this by incorporating some support structure within the lumen 204. The support structure prevents the lumen 204 from collapsing, without overly obstructing the flow of gas along the lumen 204, to the detriment of the overall performance and efficiency of a CHM device 100.

As mentioned above, some embodiments of the CHM device 100 may comprise a cold trap 224. In the context of the present description and the claims that follow, a cold trap 224 is a device or apparatus that serves to condense water vapor 218 into a liquid state by lowering its temperature. The placement of a cold trap 224 between the CHM unit 102 and the mechanical pump 226, such that the mechanical pump 226 is in fluid communication with the lumen 204 through the cold trap 224, is advantageous for a number of reasons. The cold trap 224 will further reduce the water vapor pressure within the device below the equilibrium pressure (where nothing would be flowing), further driving the movement of water vapor 218 through the inner conduit 200 wall. Additionally, by placing the cold trap 224 in front of the mechanical pump 226, the water vapor 218 is removed before entering the mechanical pump 226. If there was no cold trap 224, the mechanical pump 226 would have to compress the water vapor 218, in addition to the $CO_2$-rich gas 216, increasing the energy cost and likely causing condensation somewhere inside the pump 226. Finally, the condensation of the water vapor 218 facilitates its reuse within the inner conduit 200 (e.g. it could be returned to the water supply 220, etc.). Increased efficiency in water consumption increases the number of locations a CHM device 100 may be used, including places where replacement water is difficult to obtain. Of course, other embodiments may not make use of a cold trap 224, and instead rely on a mechanical pump 226 alone.

In some embodiments, the conduit(s), or even just the liquid water 222 inside the inner conduit 200, may be heated to a temperature 234 that is above the ambient temperature 236, to encourage the production of water vapor 218 by evaporation, which will pass into the lumen 204. In some embodiments, this may be accomplished using a light-absorbing material 230 that is in thermal contact with the inner conduit 200 and/or the water supply 220. In the context of the present description and the claims that follow, a light-absorbing material 230 is a material having properties, such as color and surface type, that make it apt to absorb sunlight 232 and heat up.

Figure 3:
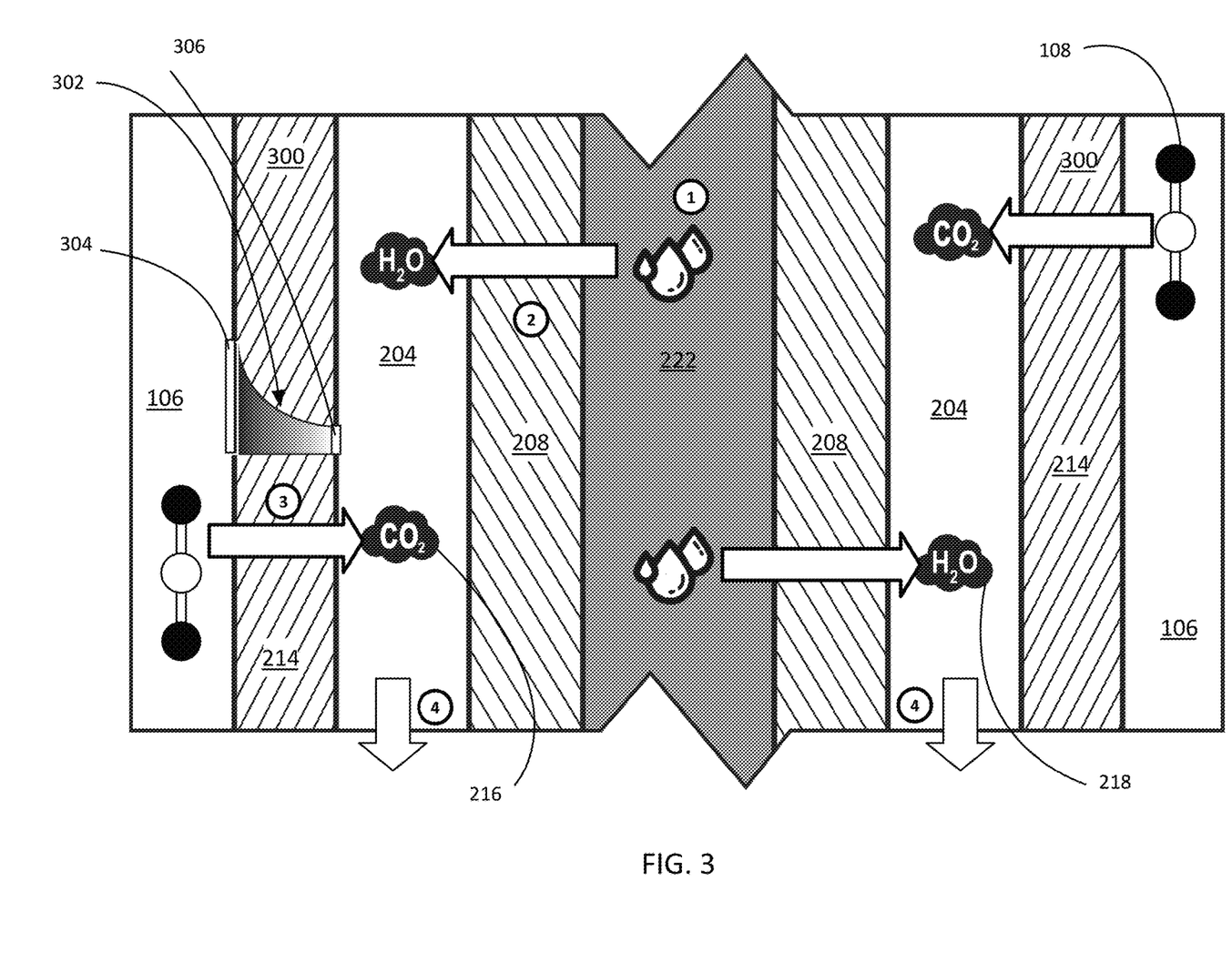
FIG. 3 is a longitudinal cross-sectional view of a hollow membrane unit.

FIG. 3 is a longitudinal cross-sectional view of a non-limiting example of a circumscribed hollow membrane unit 102. According to various embodiments, the $CO_2$ pump membrane 214 comprises a strong base anionic material 300, or anion exchange material. These materials are sometimes used in moisture-swing based carbon dioxide capture systems, but are employed in a very different way in CHM devices 100. In other embodiments, the $CO_2$ pump membrane 214 is composed of other materials that have the property of absorbing carbon dioxide when they are dry and releasing it when exposed to moisture. However, unlike a moisture-swing, this water dependent affinity for carbon dioxide is employed to create a carbon concentration gradient 302, having a first concentration 304 that is high and on the outside surface of the outer conduit 202, and a second concentration 306, that is lower and at the inside surface 212 of the outer conduit 202. This carbon concentration gradient 302 is formed and maintained by the water vapor 218 passing from the lumen 204 to the atmosphere 106 through the $CO_2$ pump membrane 214. This results in a continuous $CO_2$ pumping action, which is fundamentally different than the phased operation of a moisture swing. This concentration gradient 302 maintains its sign (e.g. direction), even though the carbon dioxide concentration on the inside of the lumen 204 may increase 500 fold, or more.

The carbon concentration gradient 302 can be maintained, even if the chemical potential of $CO_2$ on the wet inside is significantly higher than on the dry atmospheric side, so long as a moisture concentration gradient is maintained by the water vapor 218 flowing from the lumen 204 to the atmosphere through the walls of the outer conduit 202. The exergy required for this $CO_2$ pumping action is derived from the dilution of water into the dry atmosphere as it flows spontaneously from a higher chemical potential to a lower chemical potential. According to various embodiments, the $CO_2$ pump membrane 214 material may have diffusion constants for the relevant ions (e.g. carbonate, bicarbonate, hydroxide, etc.) and water that are on the order of $10^{-9}$ to $10^{-12}$ $m^2$/sec.

Overall, the carbon dioxide collection process begins with filling the inner conduit 200 with liquid water 220. See 'circle 1'. Next, water vapor 218 is introduced into the lumen 204 by allowing the liquid water 220 inside the inner conduit 200 to evaporate and pass through the vapor membrane 208. See 'circle 2'. According to various embodiments, the vapor membrane 208 is sufficiently hydrophobic and porous to contain the liquid water 220 while allowing water vapor 218 to pass through into the lumen 204.

Next, a carbon concentration gradient 302 is formed and maintained across the $CO_2$ pump membrane 214 by allowing water vapor 218 to pass from the lumen 204 to the atmosphere 106, through the $CO_2$ pump membrane 214. See 'circle 3'. The carbon concentration gradient has a first concentration 304 at the outside surface 210 that is higher than a second concentration 306 at the inside surface 212. This carbon concentration gradient actively pumps $CO_2$ 108 out of the atmosphere 106 and into the lumen 204 as a $CO_2$-rich gas 216.

Finally, the $CO_2$-rich gas 216 and water vapor 218 are harvested from the lumen 204 using a mechanical pump 226. See 'circle 4'. The mechanical pump 226 maintains a pressure differential 228 between the lumen 204 and the atmosphere 106, and provides a product stream 110 comprising the $CO_2$-rich gas 216.

Where the above examples, embodiments and implementations reference examples, it should be understood by those of ordinary skill in the art that other device geometries, pumps, traps, and fluid delivery systems could be intermixed or substituted with those provided. In places where the description above refers to particular embodiments of devices and methods for $CO_2$ capture using circumscribed hollow membranes, it should be readily apparent that a number of modifications may be made without departing from the spirit thereof and that these embodiments and implementations may be applied to other gas capture systems, devices, and methods as well. Accordingly, the disclosed subject matter is intended to embrace all such alterations, modifications and variations that fall within the spirit and scope of the disclosure and the knowledge of one of ordinary skill in the art.

What is claimed is:

1. A device for carbon dioxide capture, comprising:
   a hollow membrane unit, comprising:
     an inner conduit closed at one end, the inner conduit comprising a vapor membrane;
     an outer conduit having an outside surface exposed to an atmosphere and an inside surface circumscribing the inner conduit forming a lumen between the inner conduit and the inside surface of the outer conduit, the outer conduit comprising a $CO_2$ pump membrane, the lumen comprising a $CO_2$-rich gas and a water vapor, the water vapor being substantially saturated; and
     a light-absorbing material;
   a water supply in fluid communication with the inside of the inner conduit;
   a mechanical pump in fluid communication with the lumen, the mechanical pump maintaining a pressure differential of at least one atmosphere between the lumen and the atmosphere and providing a product stream comprising the $CO_2$-rich gas; and
   a cold trap coupled to the hollow membrane unit and the mechanical pump such that the mechanical pump is in fluid communication with the lumen of the hollow membrane unit through the cold trap;
   wherein the vapor membrane contains liquid water provided by the water supply, the vapor membrane being sufficiently hydrophobic and porous to contain the liquid water received while also allowing water vapor to pass through the vapor membrane into the lumen, the water vapor formed by the evaporation of the liquid water;
   wherein the $CO_2$ pump membrane is $CO_2$-permeable and wherein, as water vapor passes from the lumen to the atmosphere through the $CO_2$ pump membrane, a carbon concentration gradient is formed and maintained across the $CO_2$ pump membrane with a first concentration at the outside surface that is higher than a second concentration at the inside surface, said carbon concentration gradient actively pumping $CO_2$ out of the atmosphere and into the lumen; and
   wherein the liquid water inside the inner conduit is heated by sunlight absorbed by the light-absorbing material to a temperature that is above an ambient temperature, thereby facilitating the evaporation of the liquid water to introduce water vapor into the lumen.

2. The device of claim 1, wherein the mechanical pump removes $CO_2$-rich gas and water vapor from within the lumen at substantially the same rate as $CO_2$ and water vapor are introduced to the lumen through the water vapor membrane and the $CO_2$ pump membranes.

3. The device of claim 1, further comprising a plurality of hollow membrane units coupled to a manifold, the inner conduit of each hollow membrane unit in fluid communication with the water supply, the lumen of each hollow membrane unit in fluid communication with the mechanical pump through the manifold.

4. A device for carbon dioxide capture, comprising:
   a hollow membrane unit, comprising:
     an inner conduit closed at one end, the inner conduit comprising a vapor membrane; and
     an outer conduit having an outside surface exposed to an atmosphere and an inside surface circumscribing the inner conduit forming a lumen between the inner conduit and the inside surface of the outer conduit, the outer conduit comprising a $CO_2$ pump membrane, the lumen comprising a $CO_2$-rich gas and a water vapor;
   a water supply in fluid communication with the inside of the inner conduit; and
   a mechanical pump in fluid communication with the lumen, the mechanical pump maintaining a pressure differential between the lumen and the atmosphere and providing a product stream comprising the $CO_2$-rich gas;
   wherein the vapor membrane contains liquid water provided by the water supply, the vapor membrane being sufficiently hydrophobic and porous to contain the liquid water received while also allowing water vapor to pass through the vapor membrane into the lumen, the water vapor formed by the evaporation of the liquid water; and
   wherein the $CO_2$ pump membrane is $CO_2$-permeable and wherein, as water vapor passes from the lumen to the atmosphere through the $CO_2$ pump membrane, a carbon concentration gradient is formed and maintained across the $CO_2$ pump membrane with a first concentration at the outside surface that is higher than a second concentration at the inside surface, said carbon concentration gradient actively pumping $CO_2$ out of the atmosphere and into the lumen.

5. The device of claim 4, further comprising a cold trap coupled to the hollow membrane unit and the mechanical pump such that the mechanical pump is in fluid communication with the lumen of the hollow membrane unit through the cold trap.

6. The device of claim 4, wherein the liquid water inside the inner conduit is heated to a temperature that is above an ambient temperature, thereby facilitating the evaporation of the liquid water to introduce water vapor into the lumen.

7. The device of claim 6, wherein the hollow membrane unit comprises a light-absorbing material and wherein the liquid water inside the inner conduit is heated by sunlight absorbed by the light-absorbing material.

8. The device of claim 4, wherein the mechanical pump removes $CO_2$-rich gas and water vapor from within the lumen at substantially the same rate as $CO_2$ and water vapor are introduced to the lumen through the vapor membrane and the $CO_2$ pump membranes.

9. The device of claim 4, wherein the water vapor within the lumen is substantially saturated.

10. The device of claim 4, further comprising a plurality of hollow membrane units coupled to a manifold, the inner conduit of each hollow membrane unit in fluid communication with the water supply, the lumen of each hollow membrane unit in fluid communication with the mechanical pump through the manifold.

11. A method for carbon dioxide capture, comprising:
    filling an inner conduit with liquid water from a water supply in fluid communication with the inside of the inner conduit, the inner conduit comprising a vapor membrane and circumscribed within an outer conduit having an outside surface exposed to an atmosphere and an inside surface facing the inner conduit forming a lumen between the inner conduit and the inside surface of the outer conduit, the lumen running the length of the outer conduit, the outer conduit comprising a $CO_2$ pump membrane that is $CO_2$-permeable;

introducing a water vapor into the lumen by allowing the liquid water inside the inner conduit to evaporate and pass through the vapor membrane, the vapor membrane being sufficiently hydrophobic and porous to contain the liquid water while also allowing water vapor to pass through the vapor membrane into the lumen;

forming and maintaining a carbon concentration gradient across the $CO_2$ pump membrane by allowing water vapor to pass from the lumen to the atmosphere through the $CO_2$ pump membrane, the carbon concentration gradient having a first concentration at the outside surface that is higher than a second concentration at the inside surface, said carbon concentration gradient actively pumping $CO_2$ out of the atmosphere and into the lumen as a $CO_2$-rich gas; and removing $CO_2$-rich gas and water vapor from the lumen with a mechanical pump that is in fluid communication with the lumen, the mechanical pump maintaining a pressure differential between the lumen and the atmosphere and providing a product stream comprising the $CO_2$-rich gas.

12. The method of claim 11, further comprising substantially evacuating the lumen before introducing the water vapor into the lumen.

13. The method of claim 11, further comprising condensing the water vapor at it is removed from the lumen with the $CO_2$-rich gas, the water vapor condensed with a cold trap coupled to the lumen and the mechanical pump such that the mechanical pump is in fluid communication with the lumen of the hollow membrane unit through the cold trap.

14. The method of claim 11, further comprising heating the liquid water to a temperature that is above an ambient temperature to facilitate the evaporation of the liquid water while inside the inner conduit to introduce water vapor into the lumen.

15. The method of claim 14, wherein the liquid water is heated by sunlight absorbed by a light-absorbing material in thermal contact with the inner conduit.

16. The method of claim 11, wherein the $CO_2$-rich gas and water vapor is removed from within the lumen at substantially the same rate as $CO_2$ and water vapor are introduced to the lumen through the vapor membrane and the $CO_2$ pump membranes.

17. The method of claim 16, wherein the water vapor within the lumen is substantially saturated.

* * * * *

UNITED STATES PATENT AND TRADEMARK OFFICE
CERTIFICATE OF CORRECTION

PATENT NO. : 11,478,745 B2
APPLICATION NO. : 17/010799
DATED : October 25, 2022
INVENTOR(S) : Klaus Lackner It is certified that error appears in the above-identified patent and that said Letters Patent is hereby corrected as shown below:

In the Claims

Column 15, Line 58, please delete the word "water" before "vapor membrane".

Column 18, Line 5, please replace the word "at" with --as--.

Signed and Sealed this
Fifth Day of September, 2023

*Katherine Kelly Vidal*

Katherine Kelly Vidal
*Director of the United States Patent and Trademark Office*